United States Patent [19]
Baldwin, Jr.

[11] Patent Number: 5,368,241
[45] Date of Patent: Nov. 29, 1994

[54] ROTARY VEGETABLE GRATER

[76] Inventor: Henry C. Baldwin, Jr., 431 E. Central Blvd., Apt. 606, Orlando, Fla. 32801

[21] Appl. No.: 82,297
[22] Filed: Jun. 28, 1993
[51] Int. Cl.5 .......................................... B02C 18/06
[52] U.S. Cl. ..................................... 241/91; 241/100
[58] Field of Search ................. 241/91, 92, 100, 169.1

[56] References Cited

U.S. PATENT DOCUMENTS

| | | | |
|---|---|---|---|
| 2,342,892 | 2/1944 | Prinz | 241/91 |
| 3,461,931 | 8/1969 | Wexell | 241/91 |
| 4,081,145 | 3/1978 | Moe et al. | 241/93 |
| 4,817,481 | 4/1989 | Homma | 241/92 |
| 4,884,755 | 12/1989 | Hedrington | 241/37.5 |
| 5,308,002 | 5/1994 | Pereira | 241/92 |

FOREIGN PATENT DOCUMENTS 245367  1/1926  United Kingdom ................ 24/92

Primary Examiner—Mark Rosenbaum
Assistant Examiner—John M. Husar
Attorney, Agent, or Firm—William M. Hobby, III

[57] ABSTRACT

A vegetable grating apparatus has a housing with a plurality of sides and a top and a supporting stand attached to and supporting the housing. A shaft is rotatably mounted to the housing and has a vegetable grating blade attached to one end thereof and a handle to the other end for rotating the shaft and blade. The vegetable grating blade has a generally truncated cone shape with a large cone end open and facing a vegetable guide mounted through one side of the housing and positioned to feed a vegetable, such as a carrot, therethrough into the open end of the rotatable cone grating blade for grating the vegetable by rotating of the shaft while feeding the vegetable into the blade. A vegetable supporting member has prongs on one end for attaching to a vegetable for feeding the vegetable into the vegetable guide and grating blade. The vegetable holding member has a stop flange which abuts against the guide stop member to stop the feeding of the vegetable prior to the prongs hitting the grating blade. The bottom of the housing is open for placing a container to capture the grated vegetable.

8 Claims, 1 Drawing Sheet

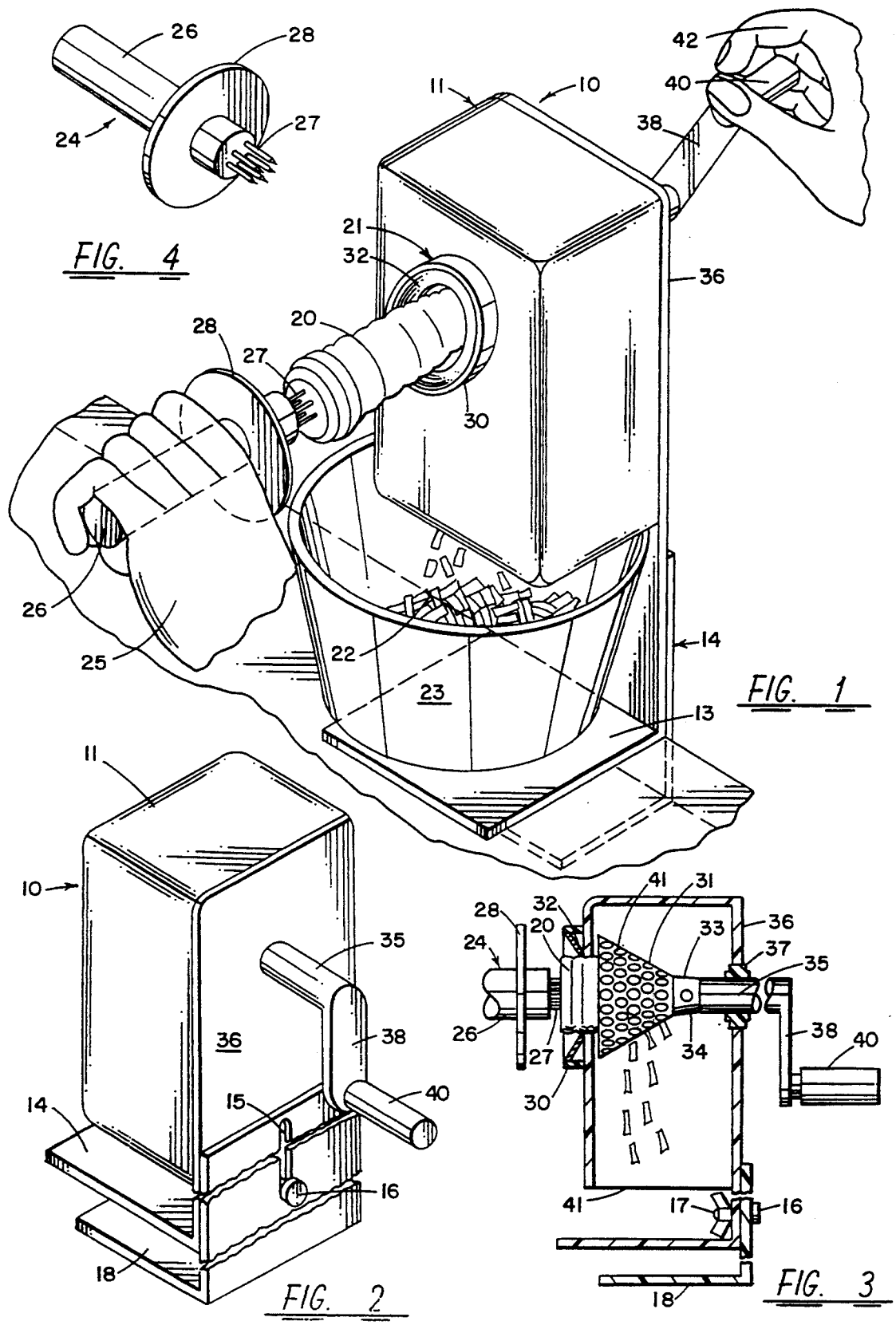

ROTARY VEGETABLE GRATER

BACKGROUND OF THE INVENTION

The present invention relates to vegetable graters and especially to a carrot grater having a conical grating blade and a guide for feeding a vegetable into the open end of the conical grating blade.

In the past, it has been common to provide vegetable graters of a variety of types, many of which have motorized or manually rotating shafts for rotating a grating blade. There are a variety of vegetable graters with rotating blades which include a rotating cylindrical shaped hollow blade mounted in a housing for feeding vegetables or other materials into the top of the grater. These are sometimes manually rotated and sometimes motorized and typically have a feed hopper or opening located on top of the blade for feeding the material being grated onto the blade. These graters frequently have a member for pushing the material being grated into the grater which may consist of a handle with a flat or arcuate surface on the end thereof for pushing into the feed hopper and sometimes these are attached to the grater. The grated material generally drops out the bottom below the grating blade where it may be captured in a bowl placed therebeneath. Another common type of cutter feeds materials, but not usually vegetables, into a rotating disc having blades thereon with the material fed directly into the side of the disc where the blades chip away the material as the disc rotates the blades into contact with the material. The disc may have a different number of blades mounted to the surface thereof and is more typically a motorized chipper for chipping wood chips or the like.

Prior art cutting and grating devices can be seen in the Prinz, U.S. Pat. No. 2,342,892, which shows a grater for moving and flaking edible rinds which is hand turned to rotate an oval shaped blade while hand-holding an orange, lemon, grapefruit or the like along the inside of the shaped blade for grating the peel. The Orland, U.S. Pat. No. 2,411,333, has a hand operated grater in which the material is fed into a side feeder having chipper blades mounted at an angle to chip away or grate the material which drops out of the bottom into a bowl. The Rote, U.S. Pat. No. 588,606, and the Homma, U.S. Pat. No. 4,817,481, each show graters or cutters in which the material being cut is fed into the side of a disc of a generally disc-shaped blade. The Newnan, U.S. Pat. No. 2,460,901, and the Lindberg et al., U.S. Pat. No. 3,407,854, each show motorized graters in which the material being grated is fed from the side into a rotating disc grater blade.

In contrast to these prior graters, the present invention is a simplified rotary grater primarily for grating carrots for use in carrot salads, cakes and the like and rapidly grates the carrot being fed into the inside of a generally conical rotating blade and has means for guiding the carrot as well as for holding the carrot while feeding the carrot into the grating blade. It also has means to stop the feed prior to the carrot holding mechanism reaching the grating blades so that a person's fingers and the vegetable holder are protected from the rotating grating blade.

SUMMARY OF THE INVENTION

A vegetable grating apparatus has a housing with a plurality of sides and a top and a supporting stand attached to and supporting the housing. A shaft is rotatably mounted to the housing and has a vegetable grating blade attached to one end thereof and a handle to the other end for rotating the shaft and blade. The vegetable grating blade has a generally truncated cone shape with a large cone end open and facing a vegetable guide mounted through one side of the housing and positioned to feed a vegetable, such as a carrot, therethrough into the open end of the rotatable cone grating blade for grating the vegetable by rotating of the shaft while feeding the vegetable into the blade. A vegetable supporting member has prongs on one end for attaching to a vegetable for feeding the vegetable into the vegetable guide and grating blade. The vegetable holding member has a stop flange which abuts against the guide stop member to stop the feeding of the vegetable prior to the prongs hitting the grating blade. The bottom of the housing is open for placing a container to capture the grated vegetable.

BRIEF DESCRIPTION OF THE DRAWINGS

Other objects, features, and advantages of the present invention will be apparent from the written description and the drawings in which:

FIG. 1 is a perspective view of a vegetable grater in accordance with the present invention having a vegetable being inserted thereinto;

FIG. 2 is a rear perspective view of the vegetable grater of FIG. 1;

FIG. 3 is a sectional view taken through the grater showing the vegetable grating; and FIG. 4 is a perspective view of the vegetable holder for feeding a vegetable into the grater blade.

DESCRIPTION OF THE PREFERRED EMBODIMENT

Referring to the drawings FIGS. 1-4, a vegetable grater 10 is shown having a housing 11 and a support stand 12 attached to the housing 11 and having a base support 13. The support stand also includes an L-shaped table locking member 14 which may have a slot 15 therethrough and a bolt 16 on one side with a wing nut 17 on the other, so that the L-shaped member 14 can be raised and lowered in the slot 15 to raise and lower a bottom table gripping member 18 to lock the vegetable grater onto a table surface.

In the vegetable grater, as shown in FIG. 1, a carrot 20 is being fed thereinto through a vegetable feeding guide 21 and shredded carrot parts 22 are falling into a bowl 23 placed below a housing 11. A carrot is shown held by vegetable supporting member 24 in a person's hand 25. The vegetable holding member 24 has a handle 26 on one end and a plurality of prongs 27 on the other end for inserting into the end of the carrot 20. A stop member or flange 28 is positioned thereon. The vegetable holding member 24, stop member 28 will abut the vegetable guide stop rim 30 when the vegetable is fed to that point which is positioned to have the end of the prongs 27 extend right up to the edge of the vegetable grating blade 31. The vegetable guide 21 also includes a conical shaped guide member 32 for directing the carrot 20 through the opening in the housing 11 wall 36. The conical blade 31 is a generally open ended truncated cone having an attaching portion 33 which may have a threaded fastener 34 therethrough for screwing onto the rotating shaft 35. The rotating shaft 35 is mounted to rotate through the housing 11 and is mounted in the wall 36 with a journal bearing 37. The shaft 35 has a crank portion 38 and a perpendicular extending handle 40 extending from the crank 38. Rotating the shaft 35 by rotating a handle 40 thereby rotates the grating blade 31 having a plurality of grating openings 41 therein. The bottom of the housing 41 is open so that the material can fall into the container 23. A hand 42 is shown turning the handle 40.

In operation, a person would select a carrot to be grated and stick the prongs 27 from the vegetable supporting member 24 into the ends thereof and then hold the handle 26 to support the carrot 20, as shown in FIG. 1. The carrot is inserted into the vegetable guide 21 and, while turning the handle 40 with the hand 42, the conical grating blade 41 is rotated while the carrot is being fed into the end thereof to be grated, as shown in FIG. 3, for dropping into the container 23, as shown in FIG. 1. The grater can first be set up by attaching the member 18 under a table edge and tightening the wing bolt 17 of the bolt 16 to support it on the edge. Alternatively, the base 13 can be used without the attaching member 14 just by setting on top of a table surface or the like and the carrot continuously grated until the flange 28 contacts the guide stop surface 30 at which point the carrot has been grated to the very tip just prior to the prongs 27 reaching the grating blade 31. A vegetable supporting member 24 can then be removed and another vegetable placed thereon.

The vegetable grater as shown in FIGS. 1–4 advantageously allows the grater to be stored and then set up on a tabletop or supportedly attached to the edge of a table and provides for the ease of removing and changing the blade with the threaded fastener 34. The grater can be made of any materials desired but non-corrosive stainless steels and polymers are preferred for sanitary reasons.

It should be clear at this time that a vegetable grater has been provided which is especially useful for carrots for use in carrot salads, carrot cake, and other recipes calling for grated carrots. However, the present invention is not to be considered as limited to the forms shown which is to be considered illustrative rather than restrictive.

I claim:

1. A vegetable grating apparatus comprising:
   a housing having a plurality of sides and a top;
   a support stand attached to and supporting said housing;
   a shaft having end portions and being rotatably supported through said housing;
   a vegetable grating blade having a generally truncated cone shape with an open end and being attached to one end portion of said shaft for rotation therewith;
   a vegetable guide mounted through one side of said housing and positioned in front of said open end of said vegetable grating blade whereby a vegetable can be fed into the open end of a cone shaped grating blade for grating said vegetable by the rotation of said shaft;
   a vegetable supporting member having prongs thereon for attaching to a vegetable for feeding the vegetable into said vegetable guide and into said grating blade and having a stop member thereon for stopping the insertion of a vegetable at a predetermined point in front of the vegetable grating blade to thereby prevent the vegetable holding prongs from contacting the vegetable grating blade; and
   said vegetable guide having a guide stop member coacting with said vegetable supporting member stop member to block said vegetable guide stop member insertion into said vegetable guide at a predetermined point.

2. A vegetable grating apparatus in accordance with claim 1 in which said shaft has handle attached thereto for rotation of said shaft and said vegetable grating blade.

3. A vegetable grating apparatus in accordance with claim 2 in which said support stand includes attaching means for attaching said vegetable grader to table surface.

4. A vegetable grating apparatus in accordance with claim 1 in which said stop member includes a flange attached to said vegetable supporting member which abuts against said guide stop member to block further insertion of an attached vegetable into said vegetable grating blade.

5. A vegetable grating apparatus in accordance with claim 1 in which said vegetable grating blade is removable attached to said shaft.

6. A vegetable grating apparatus in accordance with claim 5 in which said vegetable grating blade is removable bolted to said shaft.

7. A vegetable grating apparatus in accordance with claim 1 in which said housing has an open bottom for placing a bowl under said vegetable grating blade for collecting grated vegetables from said vegetable grating blade.

8. A vegetable grating apparatus in accordance with claim 1 in which said vegetable feed guide includes a conical carrot feed portion formed thereon.

* * * * *